United States Patent [19]
Butsuen et al.

[11] Patent Number: 5,172,929
[45] Date of Patent: Dec. 22, 1992

[54] SUSPENSION SYSTEM FOR A VEHICLE

[75] Inventors: Tetsuro Butsuen; Yasunori Yamamoto; Tohru Yoshioka, all of Hiroshima, Japan

[73] Assignee: Mazda Motor Corp., Hiroshima, Japan

[21] Appl. No.: 783,137

[22] Filed: Oct. 28, 1991

[30] Foreign Application Priority Data

Oct. 26, 1990 [JP] Japan ................................ 2-289749

[51] Int. Cl.⁵ .............................................. B60G 17/00
[52] U.S. Cl. .................................... 280/707; 188/299; 364/424.05
[58] Field of Search .................... 280/707; 188/299; 364/424.05

[56] References Cited

U.S. PATENT DOCUMENTS

| | | | |
|---|---|---|---|
| 4,905,152 | 2/1990 | Kawabata | 280/707 |
| 4,907,154 | 3/1990 | Yasuda et al. | 280/707 |
| 4,961,483 | 10/1990 | Yamaoka et al. | 188/299 |

FOREIGN PATENT DOCUMENTS 60-248419 12/1985 Japan .
61-163011 7/1986 Japan .

Primary Examiner—Kenneth R. Rice
Attorney, Agent, or Firm—Thompson, Hine and Flory

[57] ABSTRACT

In a suspension system for a vehicle comprising a shock absorber of which damping force characteristic can be changed into three or more characteristics, the predetermined running state of the vehicle is detected by detecting means and there is limited to two or so the number of the damping force characteristics to be selected from the three or more characteristics of the shock absorber according to the running state. The damping force characteristic of the shock absorber is selected and changed on the basis of a given control rule only within the limited damping force characteristics. In addition, the threshold of the control rule is changed such that the damping force characteristic of the shock absorber can easily be changed into the higher or lower level side according to the rate of change in the predetermined running state. Thus, it is possible to prevent noise and oscillation from being caused by the large change of the damping force characteristic. Furthermore, there can be obtained comfortableness to ride in and stability on a high level.

9 Claims, 6 Drawing Sheets

SUSPENSION SYSTEM FOR A VEHICLE

BACKGROUND OF THE INVENTION

This invention relates to a suspension system for a vehicle and more particularly to a suspension system which comprises a shock absorber of a damping force characteristic variable type provided between a sprung member and an unsprung member.

In general, the vehicle suspension system comprises a shock absorber provided between a sprung member (the body side) and a unsprung member (the wheel side) for damping the vertical oscillation of a wheel. There are various types of shock absorbers. By way of example, the shock absorbers of a damping force characteristic variable type are grouped into one which can change a damping force characteristic (characteristic of a different damping coefficient) into two steps (higher level and lower level) and another which can change the damping force characteristic into many steps or steplessly.

The shock absorber of a damping force characteristic variable type is basically controlled by setting the damping force of the shock absorber to the lower level side (i.e., SOFT, side) when the damping force of the shock absorber acts in the oscillation-stimulating direction with respect to the vertical oscillation of the body and setting the damping force of the shock absorber to the higher level side (i.e., HARD side) when the damping force acts in the oscillation-restraining direction so that oscillation-restraining energy is made larger than the oscillation-stimulating energy transmitted to the sprung member. Thus, comfortableness to ride in and running stability are improved.

There have been proposed various methods for judging whether the damping force of the shock absorber acts in the oscillation-stimulating direction or the oscillation-restraining direction. For examle, Japanese Patent Application Laid-Open Gazette No. 60-248419 discloses a method for judging the direction of the damping force in such a way: It is judged whether the sign of the relative displacement between the sprung member and the unsprung member is the same as that of a differentiated value thereof, which is the rlative speed between the sprung member and the unsprung member. If the signs are the same, it is judged that the damping force acts in the oscillation-stimulating direction. If the signs are not the same, it is judged that the damping force acts in the oscillation-restraining direction. Also, Japanese Patent Application Laid-Open Gazette No. 61-163011 discloses a method for judging the direction of the damping force in such a way: It is judged whether the sign of the absolute speed of the sprung member is the same as that of the relative speed between the sprung member and the unsprung member. If the signs are the same, it is judged that'the damping force acts in the oscillation-retraining direction. If the sings are not the same, it is judged that the damping force acts in the oscillation-stimulating direction.

However, in the vehicle having the shock absorber of a damping force characteristic multistep variable type, when the damping force characteristic is changed and controlled to generate an approximately ideal damping force, loud noise and oscillation are caused by the large change of the damping force characteristic of the shock absorber.

To solve the above-mentioned problem, the present applicant has proposed that the number of the damping force characteristic to be selected from three or more characteristics of the shock absorber are limited to two or so according to the running state (a vehicle speed, a lateral acceleration or the like), and that the damping force characteristic of the shock absorber is selected and changed on the basis of a given control rule only within the limited damping force characteristics (U.S. Pat. application No. 07/697,883). In this case, at the time of turning in which the lateral acceleration of the vehicle is increased, the damping force characteristic of the shock absorber is uniformly changed into the higher level side. At the time of constant turning in which body behavior is stable, it is desired that the damping force characteristic of the shock absorber is changed into the lower level side so as to seriously consider and realize the comfortableness to ride in, as compared with the time of transient turning in which the lateral acceleration is uniform.

SUMMARY OF THE INVENTION

It is an object of the present invention to further improve the above-mentioned proposal so as to obtain comfortableness to ride in and running stability on a high level.

To achieve the above-mentioned object, the present invention provides a suspension system for a vehicle having the following construction.

The suspension system for a vehicle comprises a shock absorber provided between a sprung member and an unsprung member for changing a damping force characteristic into three or more characteristics, running state detecting means for detecting the predetermined running state of the vehicle, damping force characteristic limiting means for receiving signals from the running state detecting means so as to limit the damping force characteristics to be selected from the three or more characteristics of the shock absorber according to the predetermined running state of the vehicle, damping force characteristic changing and controlling means for changing and controlling the damping force characteristic of the shock absorber on the basis of a given control rule only within the damping force characteristics limited by the damping force characteristic limiting means, and threshold changing means for changing the threshold of the control rule such that the damping force characteristic of the shock absorber can easily be changed into the higher or lower level side according to the rate of change in the predetermined running state of the vehicle.

With the above-mentioned construction, the predetermined running state (for example, a vehicle speed, a lateral acceleration or the like) is detected by the running state detecting means. The number of the damping force characteristics to be selected from the three or more characteristics of the shock absorber is limited to two or so according to the running state by the damping force characteristic limiting means. The damping force characteristic of the shock absorber is selected and changed by the damping force characteristic changing and controlling means on the basis of the given control rule only within the limited dumping force characteristics. consequently, the damping force characteristic can properly be changed according to the running state of the vehicle. In addition, noise and oscillation can be prevented from being caused by the large change of the damping force characteristic.

In the case where the damping force characteristic of the shock absorber is to be changed and controlled on the basis of the given control rule by the damping force characteristic changing and controlling means, the threshold of the control rule is changed by the threshold changing means according to the rate of change in the predetermined running state of the vehicle. Consequently, the damping force characteristic of the shock absorber can easily be changed into the higher or lower level side. By way of example, when the vehicle speed or lateral acceleration is almost constant, the damping force characteristic of the shock absorber can easily be changed into the lower level side. Thus, the comfortableness to ride in can be improved.

The above and further objects, features and advantages of the present invention will be apparent by reading the following description with reference to the accompanying drawings.

BRIEF DESCRIPTION OF THE DRAWINGS

The accompanying drawings show a preferred embodiment of the present invention, in which.

DETAILED DESCRIPTION OF A PREFERRED EMBODIMENT

A preferred embodiment of the present invention will be described below with reference to the accompanying drawings.

Figure 1:
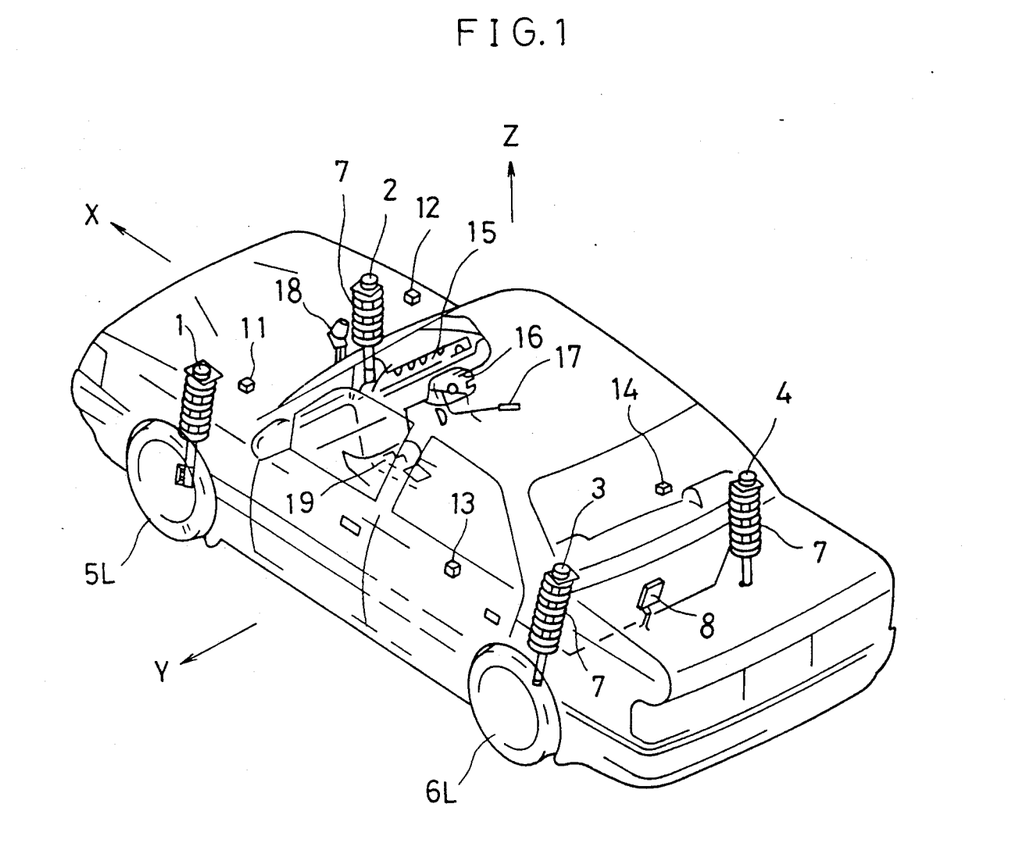
FIG. 1 is a perspective view showing the layout of components of a suspension system.

FIG. 1 shows the layout of components of a suspension system according to an embodiment of the present invention. In FIG. 1, the reference numerals 1 to 4 designate four shock absorbers, for damping the vertical oscillation of wheels, provided in right and left front wheels 5L (only a left front wheel is shown) and right and left rear wheels 6L only a left rear wheel is shown). The shock absorbers 1 to 4 have actuators 25 (see FIGS. 2 and 3) for changing damping force characteristics of different damping coefficients into three or more characteristics (six characteristics in the present embodiment as described below) respectively, and pressure sensors (not shown) as damping force detecting means for detecting the damping force which is actually generated. The reference numeral 7 designates coil springs provided on the outer circumferences of the shock absorbers 1 to 4 at their upper parts. The reference numeral 8 designates a control unit for changing and controlling the damping force characteristics by outputting control signals to the actuators provided in the shock absorbers 1 to 4. Detection signals are outputted to the control unit 8 from the pressure sensors of the shock absorbers 1 to 4.

The reference numerals 11 to 14 designate four acceleration sensors for detecting the acceleration in the vertical direction (Z direction) of the sprung member for each wheel. The reference numeral 15 designates a vehicle speed sensor provided in the meter of an instrument panel for detecting a vehicle speed. The reference numeral 16 designates a steering angle sensor for detecting the steering angle of the front wheels by the rotation of a steering shaft. The reference numeral 17 designates an accelerator opening sensor for detecting the opening of an accelerator. The reference numeral 18 designates a brake pressure switch for checking whether a brake is under operation (i.e., whether a vehicle is braking) on the basis of a brake fluid pressure. The reference numeral 19 designates a mode selecting switch by which a driver switches the damping force characteristics of the shock absorbers 1 to 4 to either HARD, SOFT or CONTROL. Those sensors 11 to 17 and switches 18 and 19 output detection signals to the control unit 8.

Figure 2:
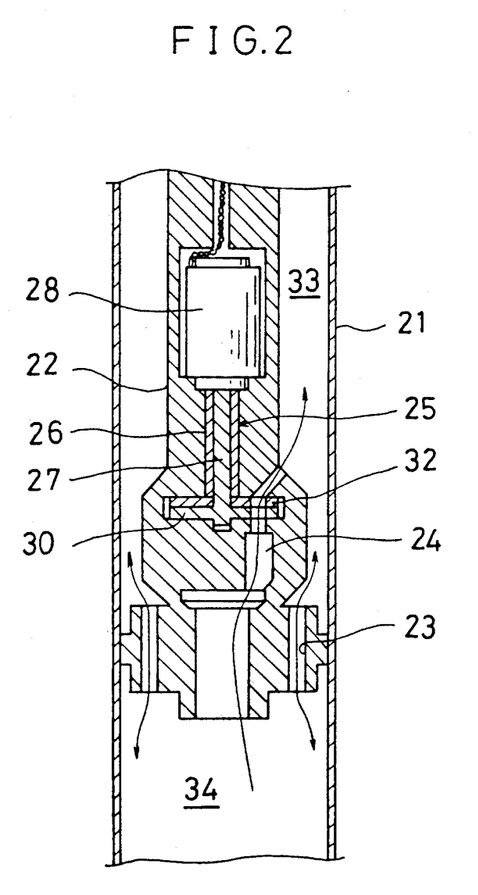
FIG. 2 is a vertically sectional side view showing the main part of a shock absorber.

FIG. 2 shows the construction of the shock absorbers 1 to 4, wherein the pressure sensors to be provided in the shock absorbers 1 to 4 are not shown.

In FIG. 2, the reference numeral 21 designates a cylinder. A piston unit 22 integrally formed by a piston and a piston rod is inserted slidably in the cylinder 21. The cylinder 21 and the piston unit 22 are connected to an axle (unsprung member) or a vehicle body (sprung member) through each joint.

Figure 3:
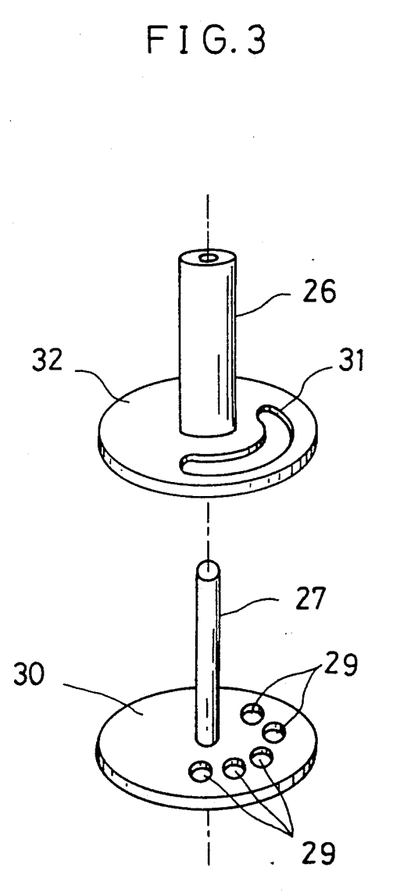
FIG. 3 is an exploded perspective view showing the construction of an actuator.

Two orifices 23 and 24 are provided in the piston unit 22. The orifice 23 is open at all times, and the throttling (passage area) of the orifice 24 can be changed into six levels by the actuator 25. Also as shown in FIG. 3, the actuator 25 includes a shaft 27 rotatably provided in the piston unit 22 through a sleeve 26, a step motor 28 for rotating the shaft 27 at a predetermined angle, a first orifice plate 30 provided integrally and rotatably with the shaft 27 at its lower end and having five round holes 29 formed at equal intervals in a circumference direction, and a second orifice plate 32 provided in the orifice 24 and having a circular long hole 31 which corresponds to the round holes 29 of the first orifice plate 30. The step motor 28 operates to rotate the first orifice plate 30. Consequently, the round holes 29 of the first orifice plate 30 are opposed to the long hole 31 of the second orifice plate 32 or not. In addition, the number of the round holes 29 opposed to the long hole 31 varies from zero to five sequentially.

An upper chamber 33 and a lower chamber 34 in the cylinder 21 and a hollow part provided in the piston unit 22 for connecting to both chambers 33 and 34 are filled with a fluid having an adequate viscosity. This fluid can flow between the upper chamber 33 and the lower chamber 34 through either the orifice 23 or 24.

With the above-mentioned construction, the shock absorbers 1 to 4 possess six damping force characteristics of different damping coefficients respectively. If five round holes 29 of the orifice plate 30 are opposed to the long hole 31 of the orifice plate 32, the damping force characteristics of the shock absorbers 1 to 4 are set to a first characteristic of the lowest damping coefficient. If four round holes 29 are opposed to the long hole 31, the damping force characteristics of the shock absorbers 1 to 4 are set to a second characteristic of a lower damping coefficient. If three round holes 29 are opposed to the long hole 31, the damping force characteristics of the shock absorbers 1 to 4 are set to a third characteristic of a slight low damping coefficient. If two round holes 29 are opposed to the long hole 31, the damping force characteristics of the shock absorbers 1 to 4 are set to a fourth characteristic of a slight high damping coefficient. If only one round hole 29 is opposed to the long hole 31, the damping force characteristics of the shock absorbers 1 to 4 are set to a fifth characteristic of a higher damping coefficient. If any round hole 29 is not opposed to the long hole 31, the orifice 24 is completely closed. Thus, the fluid can flow only through the orifice 23, so that the damping characteristics of the shock absorbers 1 to 4 are set to a sixth characteristic of the highest damping coefficient.

Figure 4:
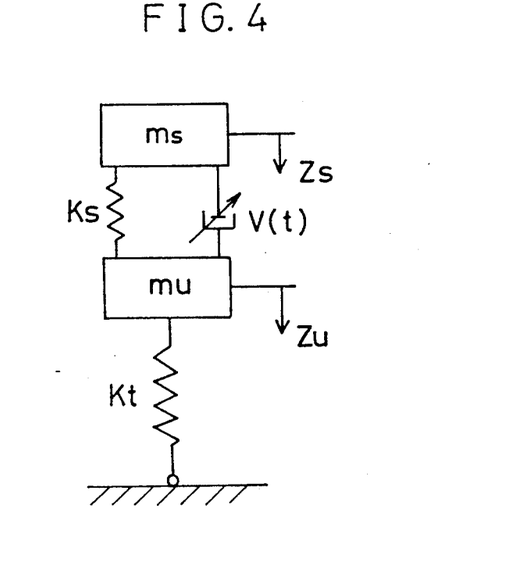
FIG. 4 is a diagram showing the oscillation model of the suspension system.

FIG. 4 shows the oscillation model of the suspension system, where ms designates a sprung-member mass, mu designates an unsprung-member mass, zs designates a sprung-member displacement, zu designates an unsprung-member displacement, ks designates the spring constant of the coil spring 7, kt designates the spring constant of a tire, and v(t) designates the damping coefficient of the shock absorber.

Figure 5:
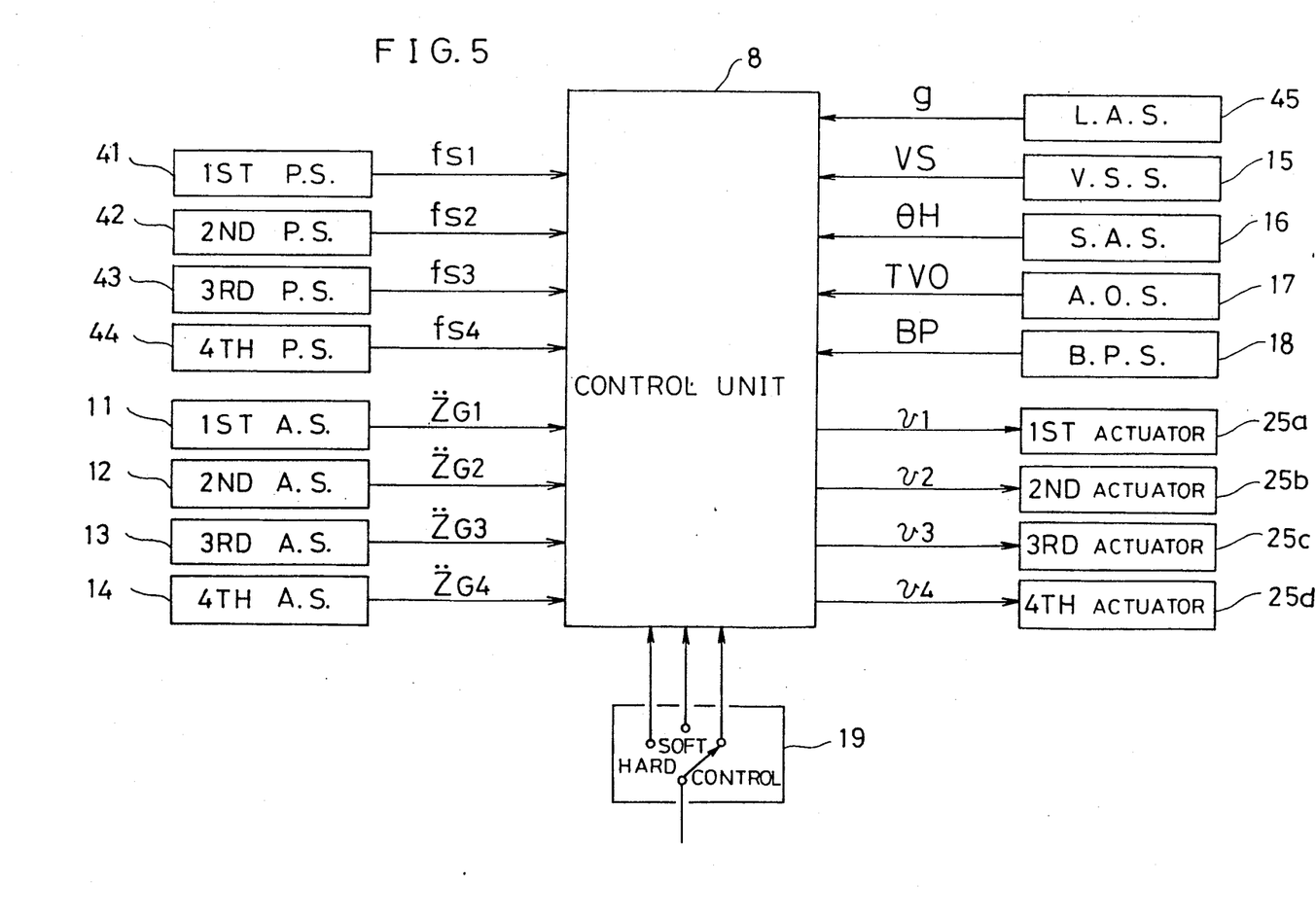
FIG. 5 is a block diagram showing the control part of the suspension system.

FIG. 5 is a block diagram showing the control part of the suspension system. In FIG. 5, a first pressure sensor 41, a first acceleration sensor 11 and a first actuator 25a correspond to a left fron wheel 5L. A second pressure sensor 42, a second acceleration sensor 12 and a second actuator 25b correspond to a right front wheel. A third pressure sensor 43, a third acceleration sensor 13 and a third actuator 25c correspond to a left rear wheel 6L. A fourth pressure sensor 44, a fourth acceleration sensor 14 and a fourth actuator 25d correspond to a right rear wheel. The actuator 25a to 25d are identical with the actuator 25 in FIG. 2. The pressure sensors 41 to 44 are provided in the shock absorbers 1 to 4.

In FIG. 5, fs1 to fs4 are damping force signals which are outputted to the control unit 8 from the first to fourth pressure sensors 41 to 44. Those signals take continuous values. When the damping force acts upward, the signal is positive. When the damping force acts downward, the signal is negative.

$Z_{G1}$ to $Z_{G4}$ are vertical (Z direction) sprung-member absolute acceleration signals which are outputted to the control unit 8 from the first to fourth acceleration sensors 11 to 14. Those signals take continuous values. When the sprung member receives the upward acceleration, the signal is positive. When the sprung member receives the downward acceleration, the signal is negative.

A vehicle speed signal VS, a steering angle signal $\theta H$ and an accelerator opening signal TVO are outputted to the control unit 8 from the vehicle speed sensor 15, the steering angle sensor 16 and the accelerator opening sensor 17, respectively. Those signals take continuous values. The vehicle speed signal VS is positive when the vehicle moves forward, and it is negative when the vehicle moves rearward. The steering angle signal $\theta H$ is positive when the steering wheel turns counterclockwise from a driver's view (i.e., turns to the left), and it is negative when the steering wheel turns clockwise (i.e., turns to the right).

A brake pressure signal BP is outputted from the brake pressure switch 18 to the control unit 8, and takes two values of ON and OFF. "ON" means that the brake is under operation. "OFF" means that the brake is not under operation.

The reference numeral 45 designates a lateral acceleration sensor for detecting the lateral acceleration which acts on the body (sprung member). A lateral acceleration signal g is outputted from the sensor 45 to the control unit 8, and takes a continuous value.

Actuator control signals v1 to v4 are outputted from the control unit 8 to the actuators 25a to 25d, and take values of "1" to "6" corresponding to the respective six damping force characteristics (first to sixth characteristics) of the shock absorbers 1 to 4.

Moreover, mode selecting signals are outputted from the mode selecting switch 19 to the control unit 8. The mode selecting signals are a plurality of parallel signals and take three values of HARD, SOFT and CONTROL in the present embodiment. "HARD" means that a driver selects HARD mode. "SOFT" means that the driver selects SOFT mode. "CONTROL" means that the driver selects CONTROL mode. When HARD mode is selected, the damping force characteristics of the shock absorbers 1 to 4 are set HARD. When SOFT mode is selected, the damping force characteristics of the shock absorbers 1 to 4 are set SOFT. When CONTROL mode is selected, the damping force characteristics of the shock absorbers 1 to 4 are switched to either HARD or SOFT automatically and independently according to driving conditions, a road surface and the like.

Figure 6A:
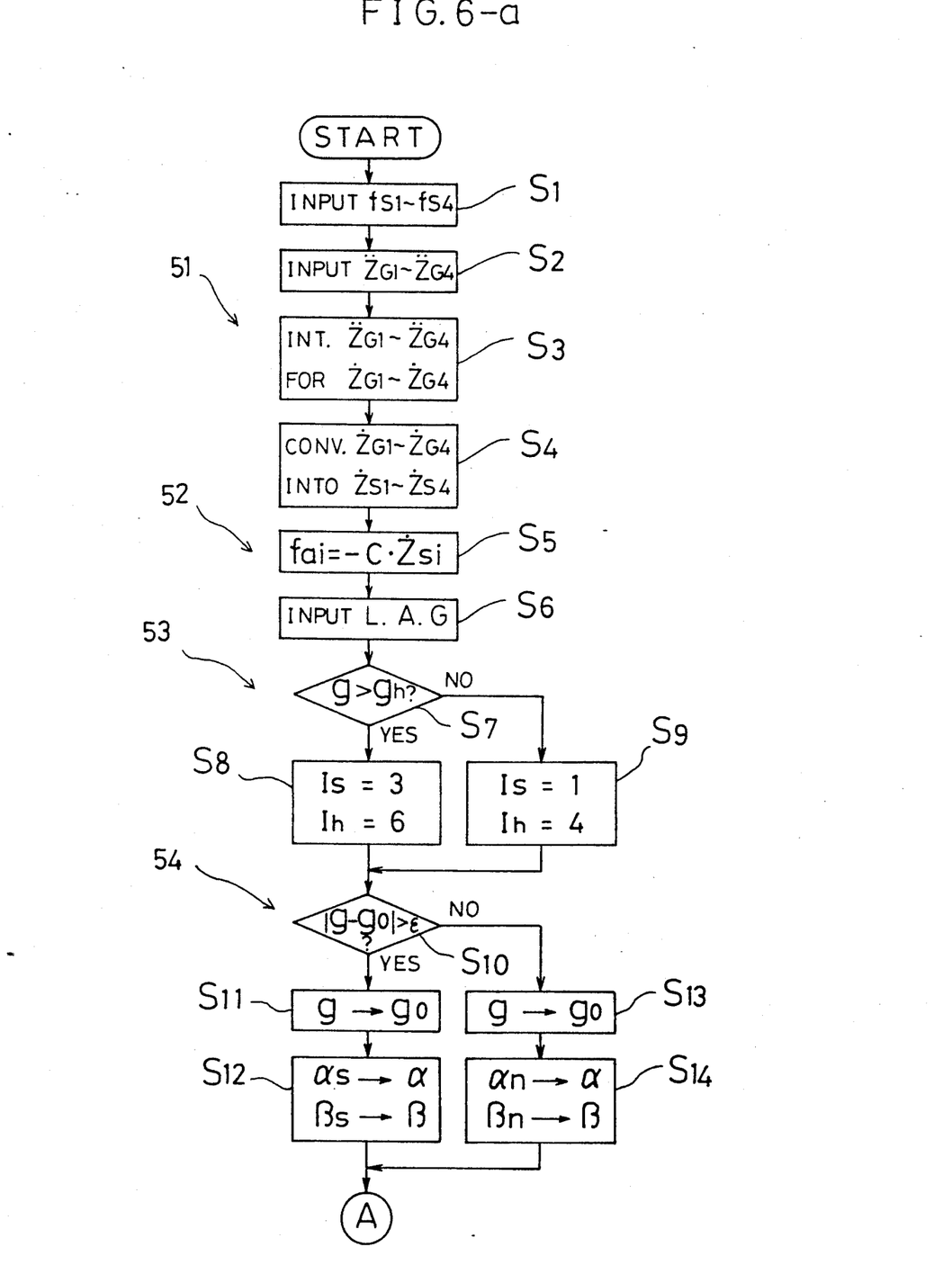
FIGS. 6a and 6b flow charts showing control flow.
Figure 6B:
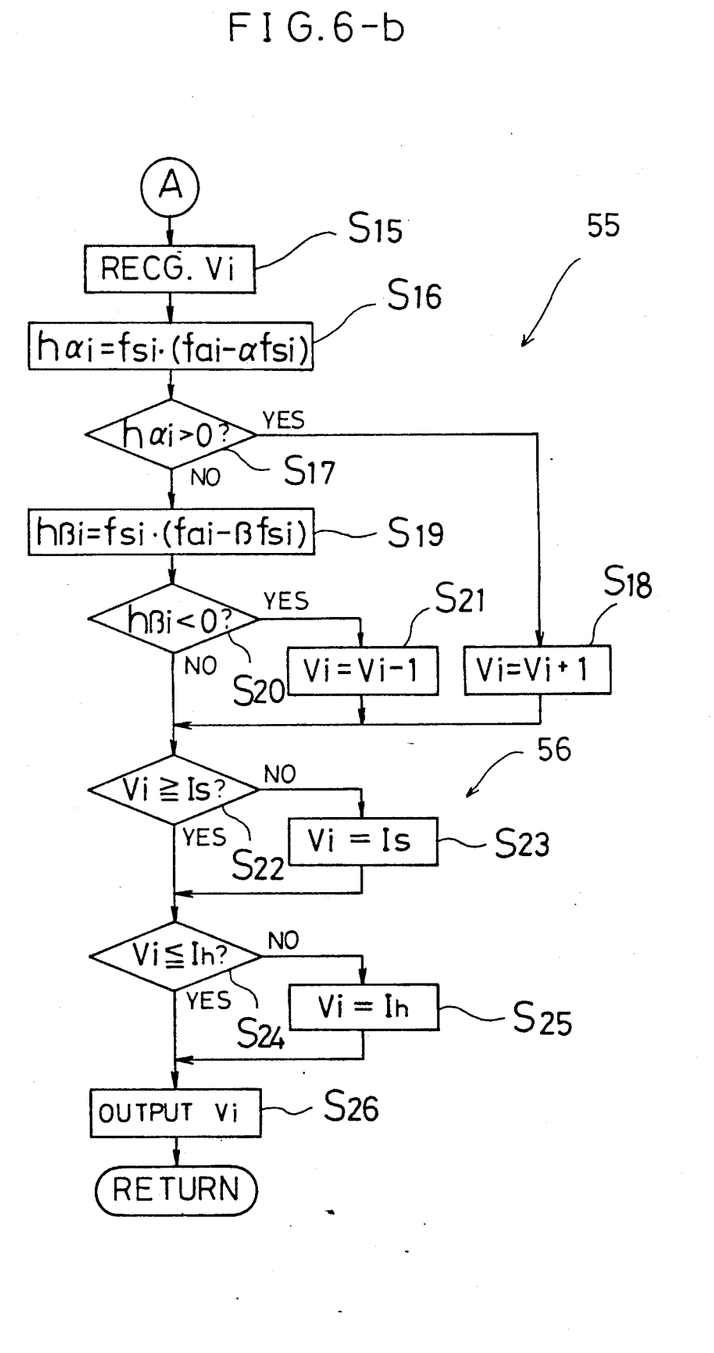

FIG. 6a and 6b show the control flow of the control unit 8 when CONTROL mode is selected by the mode selecting switch 19. The control operation is executed by the control program of the control unit 8. The control program is repeated at regular intervals (1 to 10 ms) by the starting program provided separately. The control operation will be described below in accordance with the flow.

At Step S1, the damping force signals fs1 to fs4 are inputted. At Step S2, the sprung-member absolute acceleration signals $Z_{G1}$ to $Z_{G4}$ are inputted. At Step S3, the signals $Z_{G1}$ to $Z_{G4}$ are integrated by numerical integration or the like so as to obtain vertical body absolute speeds $Z_{G1}$ to $Z_{G4}$. Since $Z_{G1}$ to $Z_{G4}$ are vertical sprung-member absolute speeds at the acceleration sensors 11 to 14, they are converted into vertical sprung-member absolute speeds $Z_{S1}$ to $Z_{S4}$ at the shock absorbers 1 to 4 in Step S4. $Z_{S1}$ to $Z_{S4}$ can be obtained if three values of $Z_{G1}$ to $Z_{G4}$ are found. Therefore, $Z_{G1}$ to $Z_{G3}$ will be used below and $Z_{G4}$ will be a substitute. As shown in FIG. 1, an origin is properly set in a horizontal plane. The coordinates for the acceleration sensors 11 to 13 and for the shock absorbers 1 to 4 are expressed by $(x_{G1}, y_{G1})$ to $(x_{G3}, y_{G3})$ and $(x_{S1}, y_{S1})$, to $(x_{S4}, y_{S4})$, respectively. Then, $Z_{S1}$ to $Z_{S4}$ are obtained by the following formula:

$$\begin{bmatrix} Z_{S1} \\ Z_{S2} \\ Z_{S3} \\ Z_{S4} \end{bmatrix} = \begin{bmatrix} 1 & y_{S1} & -x_{S1} \\ 1 & y_{S2} & -x_{S2} \\ 1 & y_{S3} & -x_{S3} \\ 1 & y_{S4} & -x_{S4} \end{bmatrix} \begin{bmatrix} 1 & y_{G1} & -x_{G1} \\ 1 & y_{G2} & -x_{G2} \\ 1 & y_{G3} & -x_{G3} \end{bmatrix}^{-1} \begin{bmatrix} Z_{G1} \\ Z_{G2} \\ Z_{G3} \end{bmatrix}$$

where two coefficient matrixes and a product thereof are predetermined and given as constants.

Steps S2 to S4 and the acceleration sensors 11 to 14 form sprung-member absolute speed detecting means 51 for detecting the vertical sprung-member absolute speeds $Z_{S1}$ to $Z_{S4}$ at the shock absorbers 1 to 4.

At Step S5, there is obtained a skyhook damper force fai as an ideal damping force by the following formula.

$$f_{ai} = -c \cdot Z_{si} \ (i=1, 2, 3, 4)$$

In other words, the skyhook damper force fai is a value having a negative sign which is obtained by multiplying a gain value c and a sprung-member absolute speed Zsi at each wheel together. Step S5 forms skyhook damper force calculating means 52 for calculating the skyhook damper force fai.

At Step S6, the lateral acceleration g is inputted. At Step S7, it is judged whether the lateral acceleration g is greater than a predetermined value gh. The predetermined value gh is a lateral acceleration which is generated at a minimum when turning. If the lateral acceleration g is greater than the predetermined value gh, the vehicle is in the state of turning. Accordingly, the lateral acceleration sensor 45 (see FIG. 5) functions as running state detecting means. The lateral acceleration sensor 45 serves to detect the lateral acceleration g of the vehicle. The running state detecting means serves to detect the turning state of the vehicle.

If the judgment is YES in Step S7, i.e., the vehicle is in the state of turning, lower and upper limit damping force characteristics Is and Ih are respectively set to the third and sixth characteristics at Step S8. If the judgment is No, i.e., the vehicle is not in the state of turning, the lower and upper limit damping force characteristics Is and Ih are respectively set to the first and fourth characteristics at Step S9. Steps S7 to S9 form damping force characteristic limiting means 53 for limiting to four the number of the characteristics to be selected from the six damping force characteristics of the shock absorbers 1 to 4 according to whether the vehicle is in the state of turning.

After the upper and lower limit damping force characteristics are set, it is judged whether the absolute value of the difference between the lateral acceleration g at that moment inputted in Step S6 and a lateral acceleration go of one cycle before, i.e., the variation or rate of change of the lateral acceleration is greater than a predetermined value $\epsilon$ at Step S10. If the judgment is YES, the lateral acceleration g at that moment is replaced by the lateral acceleration go of one cycle before at Step S11. At Step S12, $\alpha s$ and $\beta s$ are substituted for $\alpha$ and $\beta$, respectively. If the judgment is NO, the lateral acceleration g at that moment is replaced by the lateral acceleration go of one cycle before at Step S13. At Step S14, $\alpha n$ and $\beta n$ are substituted for $\alpha$ and $\beta$, respectively.

$\alpha$ and $\beta$ are upper and lower limit thresholds in a predetermined damping force characteristic range on the basis of the control rule which changes and controls the damping force characteristics of the shock absorbers 1 to 4 to be described below. There are the following relationships between $\alpha n$ and $\alpha s$ and between $\beta n$ and $\beta s$.

$$\alpha n > \alpha s, \beta n > \beta s$$

Figure 7A:
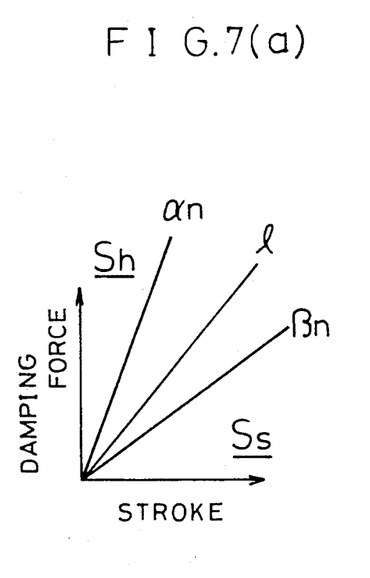
FIGS. 7a and 7b are damping force characteristic charts showing the relationship between a characteristic range and a threshold.
Figure 7B:
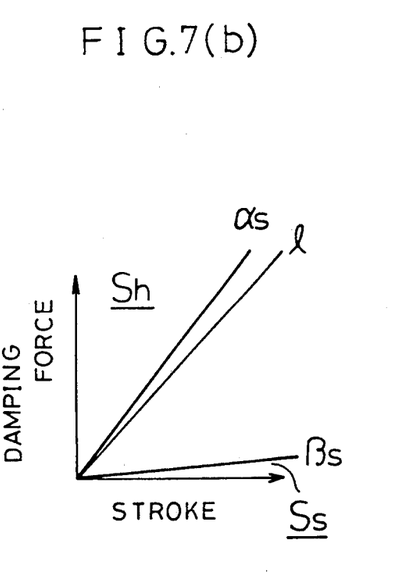

When, the rate of change of the lateral acceleration is small, i.e., the vehicle is in the state of constant turning, the upper and lower limit thresholds $\alpha n$ and $\beta n$ are positioned at an approximately equal angle with a reference line l in the damping force characteristic range as shown in FIG. 7(a). A change range Sh to HARD side is set almost the same as a change range Ss to SOFT side. When the rate of change of the lateral acceleration is great, i.e., the vehicle is in the state of transient turning, the upper limit threshold $\alpha s$ is positioned close to the reference line l and the lower limit threshold $\beta s$ is positioned apart from the reference line l in the damping force characteristic range as shown in FIG. 7(b). The change range Sh to HARD side is set greater than the change range Ss to SOFT side. Consequently, Steps S10 to S14 from threshold changing means 54 for changing the threshold of the control rule such that the damping force characteristics of the shock absorbers 1 to 4 can easily be changed into the lower level side at the time of constant turning, as compared with the transient turning state.

At either Step S12 or S14, the threshold is set. At Step S15, there is recognized the actuator control signal vi outputted to the shock absorbers 1 to 4 at that moment. At step S16, a judging function h$\alpha$i is obtained by the following formula.

$$h\alpha i = fsi \cdot (fai - \alpha \cdot fsi)$$

At Step S17, it is judged whether the judging function h$\alpha$i is a positive number. If the judgment is YES, the actuator control signal vi is increased by 1 at Step S18. Then, this routine proceeds to Step S22.

If the judgment is NO, a judging function h$\beta$i is obtained by the following formula at Step S19.

$$h\beta i = fsi, (fai - \beta \cdot fsi)$$

At Step S20, it is judged whether the judging function h$\beta$i is a negative number. If the judgment is YES, the actuator control signal vi is decreased by 1 at Step S21. Then, this routine proceeds to Step S22. If the judgment is NO, this routine proceeds to Step S22.

At Step S22, it is judged whether the actuator control signal vi is equal to or greater than the lower limit damping force characteristic Is. If the judgment is YES, this routine immediately proceeds to Step S24. If the judgment is NO, the value ("1" or "3") of the lower limit damping force characteristic Is is substituted for the actuator control signal vi at Step S23. Then, this routine proceeds to Step S24.

At Step S24, it is judged whether the actuator control signal vi is equal to or smaller than the upper limit damping force characteristic Ih. If the judgment is YES, this routine immediately proceeds to Step S26. If the judgment is NO, the value ("4" or "6") of the upper limit damping force characteristic Ih is substituted for the actuator control signal via at Step S25. Then, this routine proceeds to Step S26. At step S26, the actuator control signal vi is outputted. Thereafter, this routine returns.

Steps S16 to S21 form judging means 55 for calculating the product of the skyhook damper force fai and the damping force fsi of the shock absorbers 1 to 4 so as to quantitatively judge whether the damping force of the shock absorbers 1 to 4 acts in the oscillation-restraining direction or the oscillation-stimulating direction with respect to the vertical oscillation of the sprung member. Steps S22 to S26 form damping force characteristic changing and controlling means 56 for changing and controlling the damping force characteristics of the shock absorbers 1 to 4 according to whether the judging functions h$\alpha$i and h$\beta$i are positive or negative, i.e., according to the acting direction of the damping force of the shock absorbers 1 to 4 which is judged by the judging means 55 only within the damping force characteristics limited by the damping force characteristic limiting means 53. The judging functions h$\alpha$i and h$\beta$i are control rule functions which do not change the damping force characteristic between the upper and lower limit thresholds $\alpha$ and $\beta$ shown in FIG. 7a and 7b but change the damping force characteristic into HARD side by one step in the range Sh in which a threshold is greater than the upper limit threshold α, and change the damping force characteristic into SOFT side by one step in the region Ss in which the threshold is equal to or smaller than the lower limit threshold β.

According to the above-mentioned control, the damping force characteristics of the shock absorbers 1 to 4 are changed and controlled according to whether the judging functions hαi and hβi as the control rule functions are positive or negative. In this case, the judging functions hαi and hβi are determined in accordance with the product (fsi fai) of the actual damping force fsi of the shock absorbers 1 to 4 and the skyhook damper force fai, which are first terms. When the judging function hαi is positive (hαi>0), i.e., the damping force of the shock absorbers 1 to 4 acts in the oscillation-restraining direction with respect to the vertical oscillation of the sprung member, the damping force characteristics of the shock absorbers 1 to 4 are changed into HARD side. When the judging function hβi is negative (hβi<0), i.e., the damping force of the shock absorbers 1 to 4 acts in the oscillation-stimulating direction with respect to the vertical oscillation of the sprung member, the damping force characteristics of the shock absorbers 1 to 4 are changed into SOFT side. Consequently, it is possible to make oscillation-restraining energy larger than the oscillation-stimulating energy transmitted to the sprung member. Thus, there can be improved comfortableness to ride in and running stability.

From the six damping force characteristics of different damping coefficients, four characteristics (third to sixth charateristics) on HARD side are selected at the time of turning, and four characteristics (first to fourth characteristics) on SOFT side are selected at the time of non-turning. Change is carried out only within the four characteristics thus selected. Consequently, it is possible to prevent noise and oscillation from being caused by the change of the damping force characteristics while ensuring on a high level the improvement of the running stability at the time of turning and that of the comfortableness to ride in at the time of non-turning.

At the time of constant turning in which the lateral acceleration is almost constant, vehicle behavior becomes more stable as compared with the transient turning state in which the lateral acceleration is changed. According to the present embodiment, the values of α and β which are the thresholds of the judging functions hαi and hβi are changed depending on the rate of change of the lateral acceleration. At the time of constant turning, the damping force characteristics of the shock absorbers 1 to 4 are easily changed into SOFT side as compared with the transient turning state. Thus, there can be obtained the improvement of the comfortableness to ride in and that of the running stability on the higher level.

The present invention is not limited to the above-mentioned embodiment but includes many variants. According to the above-mentioned embodiment, the turning state of the vehicle is detected depending on its lateral acceleration. In addition, it is judged whether the vehicle is in the state of transient turning or constant turning depending on the rate of change of the lateral acceleration. According to the present invention, the yaw rate of the vehicle may be detected in place of the lateral acceleration. The turning state may be judged based on the yaw rate thus detected. In addition, it can be judged whether the vehicle is in the state of transient turning or constant turning depending on the rate of change of the yaw rate or a roll angle.

The vehicle speed may be detected as the running state of the vehicle so as to select two or more characteristics on HARD side which seriously consider stability at the time of lower and higher vehicle speeds and two or more characteristics on SOFT side which seriously consider the comfortableness to ride in at the time of a medium vehicle speed from three or more characteristics of the shock absorbers, respectively. The damping force characteristics of the shock absorbers may be changed and controlled on the basis of the given control rule only within the damping force characteristics thus selected. In addition, the threshold of the control rule may be changed such that the damping force characteristics of the shock absorbers can easily be changed into SOFT side at the time of a constant vehicle speed in which the rate of change of the vehicle speed, i.e., the acceleration is almost zero.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A suspension system for a vehicle comprising;
   a shock absorber provided between a sprung member and an unsprung member for changing a damping force characteristic into three or more characteristics,
   running state detecting means for detecting the predetermined running state of the vehicle,
   damping force characteristic limiting means for receiving signals from the running state detecting means so as to limit the damping force characteristics to be selected from the three or more characteristics for the shock absorber according to the predetermined running state of the vehicle,
   damping force characteristic changing and controlling means for changing and controlling the damping force characteristic of the shock absorber of the basis of a given control rule only within the damping force characteristics limited by the damping force charateristic limiting means, and
   threshold changing means for changing the threshold of the control rule such that the damping force charateristic of the shock absorber can easily be changed into the higher or lower level side according to the rate of change in the predetermined running state of the vehicle.

2. A suspension system for a vehicle according to claim 1, wherein the control rule of the damping force characteristic changing and controlling means changes the damping force characteristic of the shock absorber to the higher level side when the damping force of the shock absorber acts in the oscillation-restraining direction with respect to the vertical oscillation of the sprung member, and changes the damping force characteristic of the shock absorber to the lower level side when the damping force of the shock absorber acts in the oscillation-stimulating direction with respect to the vertical oscillation of the sprung member.

3. A suspension system for a vehicle according to claim 2, further comprising;
   sprung-member absolute speed detecting means for detecting a sprung-member absolute speed, skyhook damper force calculating means for receiving a signal from the spurung-member absolute speed detecting means so as to calculate a skyhook damper force as the function value of the sprung-member absolute speed, damping force detecting means for detecting the damping force of the shock absorber, and judging means for receiving signals from the skyhook damper force calculating means and the damping force detecting means respectively and calculating the product of the skyhook damper force and the damping force of the shock absorber so as to quantitatively judge whether the damping force of the shock absorber acts in the oscillation-restraining direction or the oscillation-stimulating direction with respect to the vertical oscillation of the sprung member.

4. A suspension system for a vehicle according to claim 1, wherein the predetermined running state of the vehicle is a vehicle speed, and the damping force characteristic limiting means limits the damping force characteristics to be selected to the higher level side at the time of lower and higher vehicle speeds and to the lower level side at the time of a medium vehicle speed, respectively.

5. A suspension system for a vehicle according to claim 4, wherein the threshold changing means changes the threshold of the control rule such that the damping force characteristic of the shock absorber can easily be changed into the lower level side when the vehicle speed is almost constant.

6. A suspension system for a vehicle according to claim 1, wherein the predetermined running state of the vehicle is a lateral acceleration, and the damping force characteristic limiting means limits the damping force characteristics to be selected to the higher level side at the time of turning in which the lateral acceleration is great and to the lower level side at the time of non-turning in which the lateral acceleration is small, respectively.

7. A suspension system for a vehicle according to claim 6, wherein the threshold changing means changes the threshold of the control rule such that the damping force characteristic of the shock absorber can easily be changed into the lower level side at the time of constant turning in which the lateral acceleration is almost constant.

8. A suspension system for a vehicle according to claim 1, wherein the shock absorber includes;

a cylinder, a piston unit inserted in the cylinder, an orifice formed in the piston unit, and an actuator for changing the throttling of the orifice into several steps.

9. A suspension system for a vehicle according to claim 8, wherein the actuator has;

a shaft rotatably provided in the piston unit, a step motor for rotating the shaft at a predetermined angle, a first orifice plate provided integrally and rotatably with the shaft at its lower end and having a plurality of round holes formed at equal intervals in a circumference direction, and a second orifice plate provided in the orifice and having a circular long hole corresponding to the round holes of the first orifice plate, the throttling of the orifice being changed into several steps by rotating the first orifice plate through the step motor and by changing the number of the round holes of the first orifice plate which are opposed to the long hole of the second orifice plate.

* * * * *